United States Patent
Meuresch

(10) Patent No.: US 12,304,489 B2
(45) Date of Patent: May 20, 2025

(54) CONTROL SYSTEM AND CONTROL METHOD FOR DETECTION AND REACTION OF A ZIPPER PROCESS FOR A MOTOR VEHICLE

(71) Applicant: ZF FRIEDRICHSHAFEN AG, Friedrichshafen (DE)

(72) Inventor: Stefan Meuresch, Koblenz (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 259 days.

(21) Appl. No.: 17/774,501

(22) PCT Filed: Nov. 6, 2020

(86) PCT No.: PCT/EP2020/081232
§ 371 (c)(1),
(2) Date: May 5, 2022

(87) PCT Pub. No.: WO2021/089753
PCT Pub. Date: May 14, 2021

(65) Prior Publication Data
US 2022/0371595 A1    Nov. 24, 2022

(30) Foreign Application Priority Data
Nov. 6, 2019 (DE) .................... 10 2019 217 099.4

(51) Int. Cl.
*B60W 30/18* (2012.01)
*B60W 30/16* (2020.01)
*B60W 40/04* (2006.01)

(52) U.S. Cl.
CPC ...... *B60W 30/18163* (2013.01); *B60W 30/16* (2013.01); *B60W 40/04* (2013.01);
(Continued)

(58) Field of Classification Search
None
See application file for complete search history.

(56) References Cited

U.S. PATENT DOCUMENTS 11,325,602 B2 * 5/2022 Ishioka ................. B60W 10/04
2009/0276135 A1   11/2009 Hagemann et al.
(Continued)

FOREIGN PATENT DOCUMENTS

DE    102009023444 A1    1/2010
DE    102009027905 A1    1/2011
(Continued)

OTHER PUBLICATIONS

PCT International Search Report for corresponding International Application Serial No. PCT/EP/2020/081232, mailed Feb. 22, 2021, pp. 1-4.
(Continued)

*Primary Examiner* — Lail A Kleinman
(74) *Attorney, Agent, or Firm* — ROSSI, KIMMS & McDOWELL LLP

(57) ABSTRACT

A control system (10) is suitable for use in one's own motor vehicle (12) and is configured and intended to use the environmental data provided to determine a position and a speed of a first motor vehicle (28) which is traveling directly ahead of one's own motor vehicle (12) in a first Lane (36), wherein one's own motor vehicle (12) is in the said lane (36). Furthermore, the control system is at least configured and intended to determine a position and a speed of a second motor vehicle (30) which is traveling in a lane (38) adjacent to the first lane (36) from the environmental data provided. Furthermore, the control system is configured and intended to detect from the environmental data provided whether there is a zipper situation. The control system is configured and intended to increase a target distance of one's own motor vehicle (12) to the first motor vehicle, if an amount of
(Continued)

a relative speed of the second motor vehicle (30) relative to one's own motor vehicle (12) or relative to the first motor vehicle (28) is less than a predetermined first value, if the second motor vehicle (30) is located between one's own motor vehicle (12) and the first motor vehicle (28) in a longitudinal direction which extends along the adjacent lane (38), and if it was detected that the zipper situation applies.

12 Claims, 2 Drawing Sheets

(52) U.S. Cl.
CPC . *B60W 2552/53* (2020.02); *B60W 2554/4041* (2020.02); *B60W 2554/4045* (2020.02); *B60W 2554/406* (2020.02); *B60W 2554/80* (2020.02)

(56) References Cited

U.S. PATENT DOCUMENTS

| | | | | |
|---|---|---|---|---|
| 2013/0226433 A1* | 8/2013 | Tominaga | ......... | B60W 50/0097 701/96 |
| 2015/0025706 A1 | 1/2015 | Roth | | |
| 2021/0039650 A1* | 2/2021 | Yu | ................... | B60W 30/18163 |
| 2021/0362713 A1* | 11/2021 | Fujimaki | ......... | B60W 30/18163 |
| 2022/0207997 A1* | 6/2022 | Yoshida | ................ | G08G 1/0175 |
| 2022/0371595 A1* | 11/2022 | Meuresch | .............. | G08G 1/167 |

FOREIGN PATENT DOCUMENTS

| | | |
|---|---|---|
| DE | 102010020047 A1 | 1/2011 |
| DE | 102013208758 A1 | 11/2014 |
| DE | 102016011893 A1 | 5/2017 |
| DE | 102018217045 A1 | 6/2019 |
| EP | 0934846 A2 | 8/1999 |
| JP | 2004038861 A | 2/2004 |

OTHER PUBLICATIONS

German Search Report for corresponding German Application Serial No. 10 2019 217 099.4, dated Oct. 27, 2020, pp. 1-8.
Written Opinion issued in Intl. Appln. No. PCT/EP2020/081232 mailed Feb. 22, 2021. English translation provided.
Office Action issued in Chinese Appln. No. 202080075594.6 mailed Feb. 28, 2025.

* cited by examiner

CONTROL SYSTEM AND CONTROL METHOD FOR DETECTION AND REACTION OF A ZIPPER PROCESS FOR A MOTOR VEHICLE

RELATED APPLICATIONS

This application is a U.S. National Stage Application filed under 35 USC 371, claiming priority to Serial No. PCT/EP2020/081232, filed on 6 Nov. 2020; which claims priority from German Patent Application DE 10 2019 217 099.4, filed 6 Nov. 2019, the entireties of which are hereby incorporated herein by reference.

BACKGROUND OF THE INVENTION

This document describes a control system and method for determining a zipper situation in road traffic. The control system and the control method respond according to the road situation.

The zipper method is used when continuous driving in a lane on a multi-lane road is not possible or when a lane ends. The zipper method enables vehicles that are prevented from moving on to cross over to the adjacent, continuing lane in such a way that these vehicles can alternately merge with a vehicle traveling in the continuous lane immediately before the start of the bottleneck (zipper method). The zipper method only applies if a lane is eliminated. If, for example, a broken-down vehicle blocks the roadway, making it necessary to change lanes, the zipper method does not apply. In such a case, the unblocked lane has priority. The driver changing lanes may therefore have to wait. Also, the zipper method does not apply on a highway's acceleration lane. If you drive onto a freeway, you must yield to vehicles in the continuous lane. The entering vehicle has to wait and may only merge into the continuous lane with the greatest care.

Traffic jams often occur in traffic situations that require a zipper method driving style. A traffic jam can be defined based on the speed of the vehicles. A traffic jam occurs when multiple vehicles drive less than 20 km/h (12.5 mph) on average for at least five minutes over a distance of at least one kilometer. A speed of vehicles from 20 to 40 km/h (12.5 to 25 mph) can be described as slow traffic.

Prior Art

So far, in so-called ACC systems (Adaptive Cruise Control), an automatic cruise control of the motor vehicle has been adapted to the speed of a motor vehicle driving traveling ahead.

A specified distance from the motor vehicle ahead should always be maintained. For this purpose, such systems determine a direction of movement and/or a speed of the motor vehicle traveling ahead to prevent the motor vehicle from crossing the path of the motor vehicle traveling ahead, thereby causing a critical situation. This relates to lane changes or turning maneuvers on the one hand and rear-end collisions on the other.

Document DE 10 2016 011 893 A1 discloses a method for assisting a driver of a vehicle when changing lanes from a current lane to an adjacent target lane. In the method, the driver of the vehicle is advised of the end of the current lane on a merging strip as the current lane, if a zipper method is envisaged, wherein the driver is additionally advised to remain in the current lane to the end and then to change lanes.

Document DE 10 2009 023 444 A1 discloses a method and a device for assisting a driver when changing lanes from a current lane to an adjacent target lane. In the method, a possible lane change to the target lane is determined on the basis of the detected traffic situation and signaled to the driver. The signaling is performed by means of a haptically perceptible steering wheel vibration.

Underlying Problem

In road traffic, a situation that requires a zipper method occurs regularly. Either are two lanes merged into one lane, or there is an obstacle in one of the lanes. In the zipper method, motor vehicles should alternately travel on in the continuing lane, that is, one motor vehicle from the ending lane and one motor vehicle from the continuing lane. This requires a specific behavior of motor vehicles in the ending and continuing lanes. Motor vehicles in the ending lane should drive up to the end or obstacle in this lane and then change to the continuing lane. Motor vehicles that were already initially in the continuing lane should allow a motor vehicle from the ending lane to merge.

For an autonomous or semi-autonomous driver assistance system to be able to control the motor vehicle correctly in the situation that requires the zipper method, it is necessary that the situation is detected correctly. Especially in the case of obstacles, such as accidents, it is difficult for the (semi-) autonomous driver assistance system to detect the accident situation as such and to take the right measures. And each situation requiring a zipper method is different in other respects as well.

The problem is therefore to provide a control system and a control method for a motor vehicle that detects a situation that requires a zipper method and that controls one's own motor vehicle according to the situation.

Proposed Solution

This problem is solved by a control system having the features of claim 1 and by a control method having the features of claim 12.

Preferred embodiments are apparent from the dependent claims 2 to 11 and 13 and from the description below.

One aspect relates to a control system configured and intended for use in a motor vehicle. This control system detects lanes, lane demarcations, lane markings, other motor vehicles and/or objects in an area in front of, laterally next to and/or behind the motor vehicle based on environmental data obtained from at least one environment sensor(s) assigned to the motor vehicle.

The at least one environment sensor is configured to provide an electronic controller of the control system with environmental data that reflect the area in front of, laterally next to, and/or behind the motor vehicle.

The control system is at least configured and intended to use the environmental data provided to determine a position and a speed of a first motor vehicle which is traveling directly ahead of one's own motor vehicle in a first lane, wherein one's own motor vehicle is in the first lane.

Furthermore, the control system is at least configured and intended to determine a position and a speed of a second motor vehicle which is traveling in a lane adjacent to the first lane from the environmental data provided.

Furthermore, the control system is at least configured and intended to detect whether there is a zipper situation from the environmental data provided. Furthermore, the control system is configured and intended to increase a target distance of one's own motor vehicle to the first motor vehicle, at least if a relative speed of the second motor vehicle relative to one's own motor vehicle or relative to the first motor vehicle is less than a predetermined first value, if the second motor vehicle is located between one's own motor vehicle and the first motor vehicle in a longitudinal direction which extends along the adjacent lane, and it was detected that the zipper situation applies.

The control system is thus able to control one's own motor vehicle in the first continuing lane in such a way that it should increase the distance to the first motor vehicle. As a result, the second motor vehicle can merge between one's own motor vehicle and the first motor vehicle in the course of the zipper method.

The control system can include a semi-autonomous driver assistance system, such as an ACC system, or be part thereof. It is also possible that the control system is part of an autonomous driver assistance system. Driving comfort is increased, particularly with semi-autonomous driver assistance systems such as the ACC system. The driver does not have to actively increase the (target) distance. It is also possible that, in addition to increasing the target distance, the control system also sends a signal to the driver which indicates that the target distance has been increased. This signal can, for example, be a light signal (signal lamp) and/or a beep.

Preferably, the first lane and the adjacent lane are arranged and designated for a traffic flow in the same direction. The traffic flow can represent the general direction of travel of the motor vehicles. If a motor vehicle "travels directly ahead" of another motor vehicle, this means in particular that there is no other motor vehicle between the one and the other motor vehicle.

The existence of the zipper situation can be detected by the control system. It is possible that the control system is a binary variable or a continuous (probability) value for the existence of the zipper situation. In the case of a continuous value, it is possible that the target distance will only be increased if the continuous value is greater than a predetermined threshold. Also, the existence of the zipper situation can be calculated from other factors/criteria.

In addition to/instead of the criterion that the second motor vehicle must be located longitudinally between one's own motor vehicle and the first motor vehicle, it may also be sufficient for the second motor vehicle to be slightly (e.g. less than 30% based on the length of the gap) behind or in front of this position. This can be particularly advantageous if the second motor vehicle is faster than one's own motor vehicle (if the second motor vehicle is traveling in the longitudinal direction behind the gap) or is slower than the first motor vehicle (if the second motor vehicle is driving in the longitudinal direction in front of the gap).

It is also possible that there are other necessary conditions for increasing the target distance. For example, it may also be necessary for the second motor vehicle to have a lane-changing signal (e.g. turn signal) which indicates that it wants to and/or will change to the first lane. It is also possible that the target distance is not increased if the first motor vehicle is accelerating and one's own motor vehicle has already reached its maximum speed and the distance between one's own motor vehicle and the first motor vehicle is thus already increasing. To increase the target distance, it may also be necessary for the current distance between one's own motor vehicle and the first motor vehicle to be less than a limit value. This limit can be predetermined or dependent on the length (in the direction of travel) and/or speed of the second motor vehicle. To increase the target distance, it can also be possible that not all conditions have to be met, but only a majority of the conditions. A necessary number of the majority of conditions and/or an evaluation of the conditions for the necessary threshold can be predetermined.

The target distance can be increased immediately or after a time delay and/or continuously. The speed and distance at which motor vehicles traveling behind are traveling (behind one's own motor vehicle) can also be taken into account. Thus, in a case where a motor vehicle traveling right behind one's own motor vehicle can be faster than one's own motor vehicle and/or travels very close to one's own motor vehicle, the target distance cannot be increased to the full extent immediately. Thus, an accident risk can be reduced. The target distance can also be increased more if the second motor vehicle is larger.

The control system can also at least be configured and intended to determine a position of a third motor vehicle, which is traveling directly ahead of the first motor vehicle in the first lane, from the environmental data provided.

Furthermore, the control system can at least be configured and intended to determine a position and a speed of a fourth motor vehicle, which is traveling ahead of the second motor vehicle in the adjacent lane and/or traveled ahead a short time before, from the environmental data provided.

Furthermore, the control system is at least configured and intended to detect whether there is a traffic jam situation from the environmental data provided. Furthermore, the control system can at least be configured and intended to detect that the zipper situation exists if the fourth motor vehicle merges from the adjacent lane to the first lane into a gap between the first motor vehicle and the third motor vehicle and if it has been detected that the traffic jam situation exists.

This has the advantage that the control system can detect a zipper situation without having to detect an obstacle or an end of the adjacent lane. This also ensures that the alternating merging sequence is automatically maintained.

The fourth motor vehicle which travels ahead of the second motor vehicle in the adjacent lane and/or traveled ahead a short time before means the motor vehicle that traveled (directly) ahead of the second motor vehicle before it came to the obstacle or end of the adjacent lane and therefore has/had to merge into the first lane. The control system can still detect the fourth motor vehicle as such when it is already in the process of changing lanes.

The existence of the traffic jam situation can be detected by the control system. It is possible that the control system is a binary variable or a continuous (probability) value for the existence of the zipper situation. In the case of a continuous value, it is possible that the target distance will only be increased if the continuous value is greater than a predetermined threshold. Also, the existence of the traffic jam situation can be calculated from other factors/criteria.

The existence of the zipper situation and/or the traffic jam situation can also be detected by one/multiple radio signal(s) (or other electromagnetic signal(s)) received. This/these signal(s) can be sent to inform the (semi-)autonomous driver assistance systems.

It is also possible that the fourth motor vehicle does not merge between the first and third motor vehicles, but that the fourth motor vehicle merges between the third motor vehicle and a motor vehicle traveling directly in front of the third motor vehicle. In this case, there may be another motor vehicle between the second and fourth motor vehicles, or there may be no further motor vehicle. In either case, the control system would detect the existence of a zipper situation. It is also possible that the control system can also detect the existence of the zipper situation if the fourth motor vehicle merges between other motor vehicles traveling even further ahead of the third motor vehicle (with several motor vehicles in between up to one's own motor vehicle).

The control system can also at least be configured and intended to determine a position of a third motor vehicle, which is traveling directly ahead of the first motor vehicle in the first lane, from the environmental data provided.

Furthermore, the control system can at least be configured and intended to determine a position and a speed of a fourth motor vehicle, which is traveling ahead of the second motor vehicle in the adjacent lane, from the environmental data provided.

Furthermore, the control system is at least configured and intended to detect whether there is a traffic jam situation from the environmental data provided. Furthermore, the control system can at least be configured and intended to determine a lane change probability, which indicates a probability that the fourth motor vehicle will merge into a gap between the first motor vehicle and the third motor vehicle from the adjacent lane into the first lane, from the environmental data provided.

Furthermore, the control system can at least be configured and intended to detect that the zipper situation exists if the lane change probability is greater than a predefined probability value and if it has been detected that the traffic jam situation exists.

When considering the lane change probability for the existence of the zipper situation, it is also possible for the control system to consider a lane change probability of a (fourth) motor vehicle that is driving in the adjacent lane and wants to merge in between two motor vehicles in front of the third motor vehicle.

The control system may determine the lane change probability using at least one of the following factors: a speed and/or an acceleration of the fourth motor vehicle, a position in a lateral direction of the fourth motor vehicle in the adjacent lane, wherein a lateral direction is perpendicular to the longitudinal direction, and/or a distance between the first motor vehicle and the third motor vehicle.

The speed and/or acceleration of the fourth motor vehicle can influence a calculation of the lane change probability in that a low (e.g. less than a threshold value) relative speed of the fourth motor vehicle relative to the first or third motor vehicle increases the lane change probability. The relative speed can for example be measured during 0.2-1.5 seconds, e.g. 400 ms (milliseconds). The acceleration of the fourth motor vehicle may increase the lane change probability when the acceleration is low. It is also possible that a positive acceleration of the fourth motor vehicle increases the probability of a lane change. It is also possible that the control system distinguishes between lateral and longitudinal speed or acceleration.

The lateral position of the fourth motor vehicle can increase the lane change probability if the fourth motor vehicle is traveling close to the first lane, i.e. close to the lane marking dividing the lanes. A lane change signal (for example turn signal) from the fourth motor vehicle, which indicates a (planned) lane change to the first lane, can also increase the probability of a lane change. Also a turning of the fourth motor vehicle and/or shifting the tires toward the first lane may increase the probability of a lane change.

The distance between the first and third motor vehicles can increase the lane change probability if this distance is at least greater than the length of the fourth motor vehicle. This distance can increase the lane change probability even further if the distance is even greater. This increase in lane change probability can also correlate proportionally, stepwise, or otherwise monotonically increasing with the distance between the first and third motor vehicles. A (lateral) distance between the fourth and third motor vehicles can also influence the lane change probability.

It is possible that one or more of the criteria just mentioned influence the lane change probability exclusively or with other criteria (also not explicitly mentioned).

The control system can further at least be configured and intended to detect that the traffic jam situation exists if a difference between an average speed of motor vehicles in the first lane and an average speed of motor vehicles in the adjacent lane is less than a predetermined second value.

The control system can also use other criteria to determine the existence of the traffic jam situation. For example, detecting one or more hazard warning lights of vehicles driving ahead can be such a further criterion. A further criterion can also be the detection of road signs or display panels which warn of traffic jams.

It is also possible that the control system does not first determine an (intermediate) value for the existence of a traffic jam situation, but uses the criteria which are used to determine the existence of the traffic jam situation directly for calculating the existence of the zipper situation.

The control system can also omit the calculation of the (intermediate) value of the existence of the zipper situation and instead use the criteria required for this calculation directly as conditions for increasing the target distance (between one's own and the first motor vehicle).

The control system can also at least be configured and intended for the purpose of detecting that the traffic jam situation exists if a number of motor vehicles which are in the adjacent lane and which pass one's own motor vehicle or are passed by one's own motor vehicle is less than a predetermined third value in a predetermined time.

The control system can also detect whether more motor vehicles that are in the fast lane (left lane in Germany) relative to the first lane in which one's own motor vehicle is traveling are being passed by one's own motor vehicle. Should the control system detect this, this can additionally increase the probability (of detecting) the traffic jam situation.

Likewise, the control system can also detect whether an increasing number of motor vehicles are passing one's own motor vehicle from a lane that should be slower (right lane in Germany) relative to the first lane. This can also increase the probability (of detecting) the traffic jam situation.

The control system can also at least be configured and intended to detect that the zipper situation exists when an obstacle in the adjacent lane is ahead in a direction of travel of one's own motor vehicle.

This can be beneficial if there is no third party and/or fourth motor vehicle in the previous sense. The control system nevertheless detects that there is a zipper situation and therefore increases the target distance from the first motor vehicle such that the second motor vehicle is allowed to merge.

It is also possible that the control system detects a traffic sign that requires the zipper method to be carried out. The control system can also detect that the adjacent lane ends. This would also allow the control system to detect that a zipper situation exists.

The control system can increase the target distance of one's own motor vehicle from the first motor vehicle to a lesser extent if the second motor vehicle is faster than one's own motor vehicle.

The control system can increase the target distance of one's own motor vehicle from the first motor vehicle to a greater extent if the second motor vehicle is slower than one's own motor vehicle.

This takes account of the (longitudinal) change in distance between one's own motor vehicle and the second motor vehicle due to the relative speed.

In the control system, the first value may be proportional to a speed of one's own vehicle.

The first value is a threshold value below which the amount of the relative speed of the second motor vehicle relative to one's own motor vehicle or relative to the first motor vehicle must fall for the target distance to be increased.

The first value can also depend on the speed of the first or second motor vehicle.

The control system, wherein the zipper situation is a situation in which one of two lanes adjacent to each other, preferably the adjacent lane, ends at a position ahead in a traveling direction of one's own motor vehicle and/or is no longer passable, wherein the two lanes are both configured and intended for traffic in the same direction, and in which motor vehicles from the two lanes are to alternately merge in the other, continuing lane in such a manner that one motor vehicle that was originally in one lane is followed by a motor vehicle that was originally in the other lane.

The continuing lane is preferably the first lane. The adjacent lane can be to the left or right from the first lane. There may also be other lanes.

Another aspect relates to a control method which detects lanes, lane demarcations, lane markings, other motor vehicles and/or objects in an area in front of, laterally next to, and/or behind the motor vehicle based on environmental data obtained from at least one environment sensor(s) assigned to the motor vehicle. Specifically, the control method is performed by means of the above control system. The control method includes at least the following steps:
  determining, from the environmental data provided, a position and a speed of a first motor vehicle, wherein the first motor vehicle travels directly in front of one's own motor vehicle in a first lane, wherein one's own motor vehicle is in the first lane,
  determining, from the environmental data provided, a position and a speed of a second motor vehicle, wherein the second motor vehicle travels in an adjacent lane which is adjacent to the first lane,
  detecting, from the environmental data provided, whether a zipper situation exists,
  increasing a target distance of one's own motor vehicle to the first motor vehicle, at least if a relative speed of the second motor vehicle relative to one's own motor vehicle or relative to the first motor vehicle is less than a predetermined first value, if the second motor vehicle is located between one's own motor vehicle and the first motor vehicle in a longitudinal direction which extends along the adjacent lane, and if it was detected that the zipper situation applies.

Yet another aspect relates to a motor vehicle that comprises a control system as described above.

In contrast to conventional driver assistance systems, the solution presented here detects a zipper situation and responds to it. The zipper situation is reliably detected, either by an obstacle, the end of a lane or the behavior of the other motor vehicles.

Driving comfort is increased by increasing the target distance from the motor vehicle ahead in response. In the case of semi-autonomous driver assistance systems, the driver no longer has to take any active precautions to carry out the zipper method. Also, the zipper method is complied with by making enough room for the second motor vehicle to merge.

It will be apparent to those skilled in the art that the aspects and features described above can be incorporated in any way in a control system and/or can be combined in a control method. While some of the features described above have been described in relation to a control system, it should be understood that these features may also apply to a control method. Likewise, the features described above in relation to a control method can correspondingly apply to a control system.

BRIEF DESCRIPTION OF THE DRAWINGS

Other goals, features, advantages and application options can be derived from the following description of exemplary embodiments which are not to be understood as limiting, with reference to the associated drawings. All features described and/or shown individually or in any combination illustrate the subject matter disclosed herein. The dimensions and proportions of the components shown in the figures are not to scale. Components that are the same or have the same effect are provided with the same reference symbols.

DETAILED DESCRIPTION OF THE DRAWINGS

Aspects primarily related to the control system are described throughout the following disclosure. However, these aspects are of course also valid within the framework of the disclosed control method, which can be performed, for example, by a central control unit (ECU) of a motor vehicle. This can be done by carrying out suitable write and read access operations to a memory assigned to the motor vehicle. The control method can be implemented within the motor vehicle both in hardware and software or in a combination of hardware and software. This also includes digital signal processors, application-specific integrated circuits, field programmable gate arrays, and other suitable switching and arithmetic components.

Figure 1:
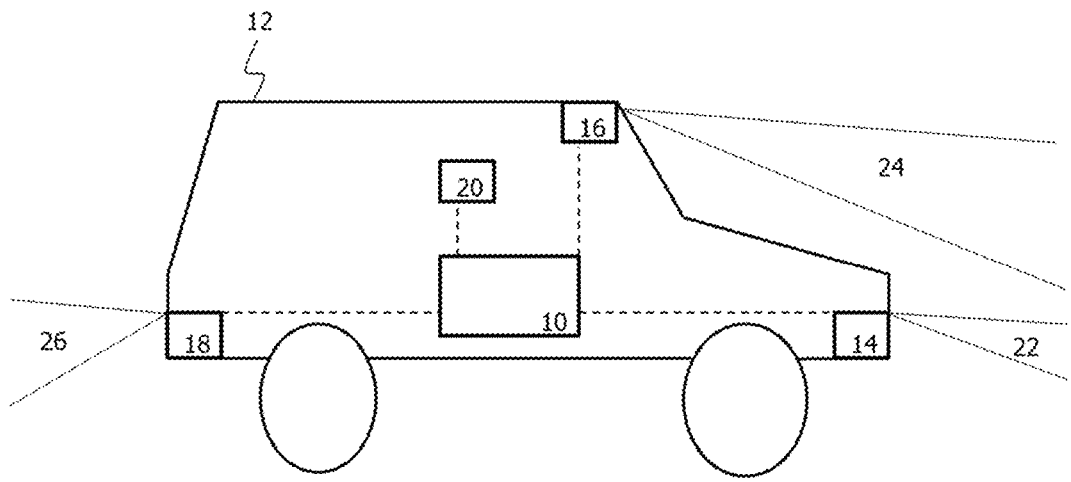
FIG. 1 shows a schematic view of a motor vehicle according to exemplary embodiments, which has a control system and at least one environment sensor.

FIG. 1 shows one's own motor vehicle 12, which includes a control system 10. The control system 10 is coupled to at least one environment sensor 14, 16, 18 located on one's own motor vehicle 12 to obtain environmental data from the at least one sensor 14, 16, 18. The control system 10 may include an electronic control unit (ECU; not shown in the figure). For example, the present control system 10, using the ECU and/or further electronic control systems, can at least be configured and intended to detect a zipper situation and to increase a target distance. For this purpose, the ECU receives, for example, signals from the environment sensors 14, 16, 18, processes these signals and the associated environmental data, and generates respective control and/or output signals.

Three environment sensors 14, 16, 18 are shown in FIG. 1, which sensors send respective signals to the control system 10 or the electronic control unit, ECU. In particular, at least one environment sensor 14 which is directed forward in the direction of travel of one's own motor vehicle 12 and detects a region 22 in front of one's own motor vehicle 12 is arranged on one's own motor vehicle 12. This at least one environment sensor 14 can, for example, be arranged in the area of a front bumper, a front lamp and/or a front grille of one's own motor vehicle 12. As a result, the environment sensor 14 detects an area 22 directly in front of one's own motor vehicle 12.

At least one additional or alternative environment sensor 16, also directed forward in the direction of travel of one's own motor vehicle 12, is shown in the area of a windshield of one's own motor vehicle 12. For example, this environment sensor 16 can be arranged between an inside rearview mirror of one's own motor vehicle 12 and its windshield. Such an environment sensor 16 detects an area 24 in front of one's own motor vehicle 12, wherein, depending on the shape of one's own motor vehicle 12, an area 24 directly in front of one's motor vehicle 12 cannot be detected due to the front section (or its geometry) of one's own motor vehicle 12.

Furthermore, at least one environment sensor 18 can be arranged on the side and/or at the rear of one's own motor vehicle 12. This optional environment sensor 18 detects an area 26, which is located to the side and/or behind one's own motor vehicle 12 in the direction of travel of one's own motor vehicle 12. For example, the data or signals from this at least one environment sensor 18 can be used to verify information detected by the other environment sensors 14, 16 and/or be used to determine a curvature of a lane in which one's own motor vehicle 12 is traveling.

The at least one environment sensor 14, 16, 18 can be implemented as desired and can be a front camera, a rear camera, a side camera, a radar sensor, a lidar sensor, an ultrasonic sensor, and/or include an inertial sensor. For example, the environment sensor 14 can be implemented in the form of a front camera, a radar, lidar, or ultrasonic sensor. A front camera is particularly suitable for the higher-mounted environment sensor 16, while the environment sensor 18 arranged in the rear of one's own motor vehicle 12 can be implemented in the form of a rear camera, a radar, lidar, or ultrasonic sensor.

The electronic control unit ECU processes the environmental data obtained from the environment sensor(s) 14, 16, 18 in one's own motor vehicle 12 to obtain information regarding the static environment (immovable environmental objects such as roadway boundaries, stationary obstacles) and the dynamic environment (moving environmental objects such as other motor vehicles or road users) of one's own motor vehicle 12.

In this way, the electronic control unit processes the environmental data obtained from the environment sensor(s) 14, 16, 18 on one's own motor vehicle 12 to detect a lane in which the motor vehicle 12 is driving, with a first and a second lateral lane demarcation in front of one's own motor vehicle 12. In addition, the electronic control unit ECU processes the environmental data obtained from the environment sensor(s) 14, 16, 18 on one's own motor vehicle 12 to detect a lane occupied by another object (which is adjacent to the lane traveled by (one's own) motor vehicle, which can also include other lanes) and their lateral lane demarcations in front of, laterally next to, and/or behind one's own motor vehicle 12. The other object can be one (or more) other motor vehicle(s) moving along the lane adjacent to the lane of one's own motor vehicle, or any other possible obstacle in the lane in front of this other motor vehicle.

For this purpose, the environment sensors 14, 16, 18 of the electronic control unit ECU provide environmental data reflecting the area in front of, laterally next to, and/or behind the motor vehicle. For this purpose, the control system 10 is connected to the at least one environment sensor 14, 16, 18 via at least one data channel or bus (shown in dashed lines in FIG. 1). The data channel or bus can be implemented using cables or wirelessly.

Alternatively or additionally, the control system 10 or its electronic control unit ECU can also receive data from one or more other assistance systems 20 or another controller 20 of the one's own motor vehicle 12, which indicate the lanes traveled by one's own motor vehicle 12, another motor vehicle, and other motor vehicles with their lateral lane demarcations, or can be derived therefrom. Thus, data and information already determined by other systems can be used by the control system 10.

The driver assistance system 20 or the electronic controller 20 can also be configured and intended to (semi-) autonomously control the motor vehicle. In this case, the control system 10 is configured and intended to output data to the driver assistance system 20 or the electronic controller 20 for autonomous driving. In particular, the control system 10 (or its ECU) can increase data, a target distance (to a motor vehicle traveling ahead) and output this information to the component 20. The data can also be transmitted by wire or wirelessly via a data channel or bus.

Figure 2:
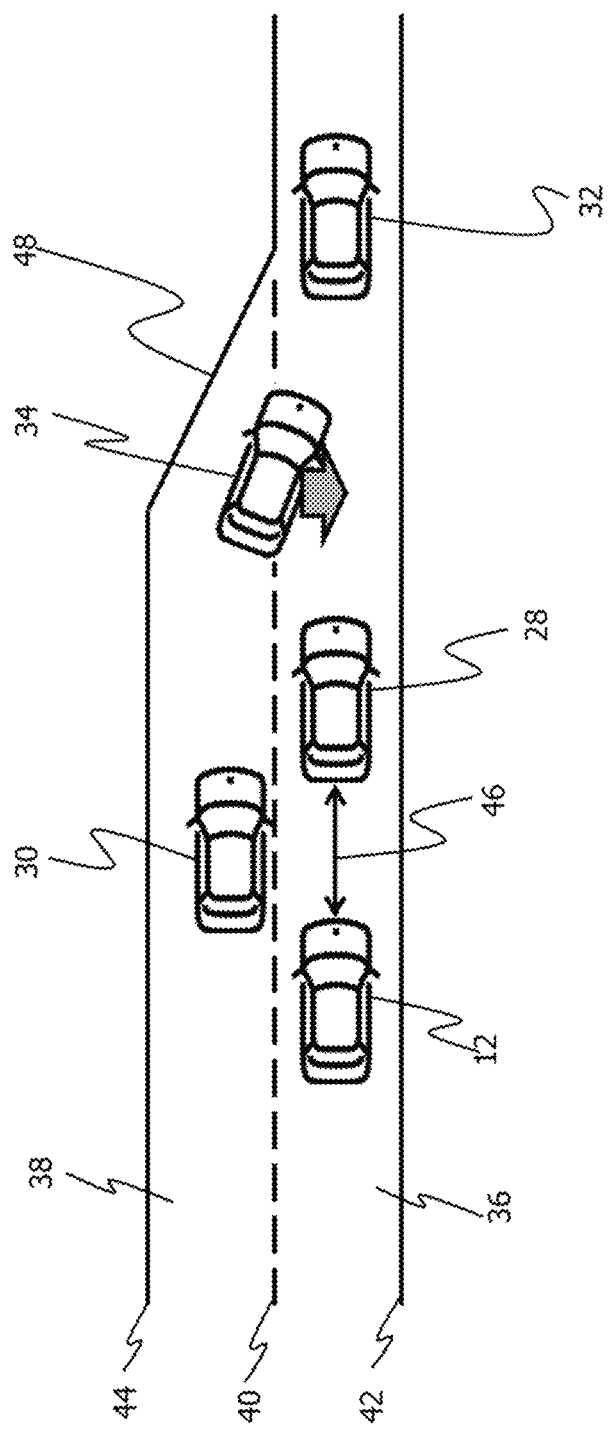
FIG. 2 shows a schematic view of an exemplary zipper situation.

FIG. 2 shows a schematic view of an exemplary zipper situation in which the control system 10 controls one's own motor vehicle 12 in such a way that the target distance is increased. In addition to one's own motor vehicle 12, the first motor vehicle 28, the second motor vehicle 30, the third motor vehicle 32 and the fourth motor vehicle 24 can be seen. One's own motor vehicle 12, the first motor vehicle 28, and the third motor vehicle are in the first lane 36. The second motor vehicle is in the adjacent lane 38. The first lane 36 and the adjacent lane 38 are separated from one another by the lane marking 40. On the outside, the first lane 36 is delimited by the lane marking 42 and the second lane 38 by the lane marking 44. The fourth motor vehicle 34 is just changing from the adjacent lane 38 to the first lane 36 and is thereby crossing the lane marking 40. This is also indicated by the gray arrow at the fourth motor vehicle 34. The double arrow 46 indicates an (actual) distance between one's own motor vehicle 12 and the first motor vehicle 28. The lane marking 48 shows that the adjacent lane 38 can no longer be traveled.

The zipper method can also be detected based on FIG. 2. The motor vehicles line up in the continuing, first lane 36 in alternating order. The third motor vehicle 32, which was also previously traveling in the first lane 36, travels first. The fourth motor vehicle 34 then merges from the adjacent lane 38 into the first lane 36 and thus positions itself second. Then comes the first motor vehicle 28, which was already traveling in the first lane 36, and thus falls in line as third. Then comes the second motor vehicle 30, which is still traveling in the adjacent lane 38, but will soon merge between the first motor vehicle 28 and one's own motor vehicle 12 and thus falls in line as fourth. After that comes one's own motor vehicle, which was previously in its own lane 36 and falls in line as fifth. Thus, the motor vehicles line up in alternating order.

The control system 10 of one's own motor vehicle 12 can detect from the environmental data provided that the fourth motor vehicle 34 merges into a gap between the first motor vehicle 28 and the third motor vehicle 32. If there is also a traffic jam situation, the control system 10 detects that there is a zipper situation. The control system 10 may have previously analyzed whether a traffic jam situation exists. It can, for example, have measured over a specified time (e.g.: last 10 seconds/30 seconds/1 minute or the like) how many motor vehicles in the adjacent lane have passed one's own motor vehicle 12 or were passed by it. If this value is low, the control system 10 can detect that there is a traffic jam situation. Alternatively, the control system can also detect the existence of a traffic jam situation from the fact that the average speed of the adjacent lane is the same as or close to the average speed of the first lane.

The control system 10 may also detect that the gap between the first motor vehicle 28 and the third motor vehicle 32 is large enough for the fourth motor vehicle 34 to merge into. This fact can increase the probability (of detecting) a zipper situation.

The control system 10 can also detect that the distance between one's own motor vehicle 12 and the first motor vehicle 28 is not great enough for the second motor vehicle 30 to merge into it. The control system 10 also determines the relative speed of the second motor vehicle 30 relative to one's own motor vehicle 12 or to the first motor vehicle 28. The control system 10 can detect these factors from the environmental data provided and, in response, increase the target distance between one's own motor vehicle 12 and the first motor vehicle 28. The second motor vehicle is traveling close to the lane marker 40 and is likely to change lanes. This can also be detected and have an impact on decision-making.

In cases in which the environment sensors 14, 16, 18 of one's own motor vehicle 12 cannot directly (optically, linearly) detect the fourth motor vehicle 34, it is possible that the fourth motor vehicle 34 is detected by reflected beams (which are reflected, for example, under the first motor vehicle 28 on the ground). The reflected beams come from the fourth motor vehicle 34, are reflected on the ground (under the first motor vehicle 28) and are detected by a sensor of one's own motor vehicle. This is possible, for example, using the radar sensor. Likewise, the third motor vehicle 32 can be detected.

Figure 3:
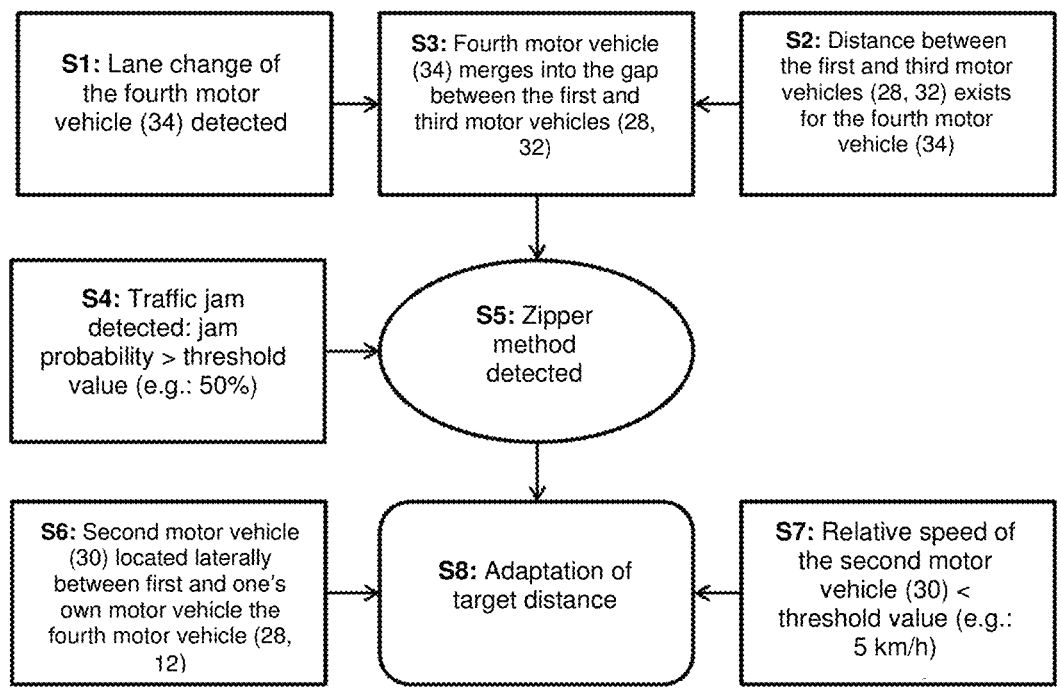
FIG. 3 shows a schematic view of the architecture for making the decision to increase the target distance according to exemplary embodiments.

FIG. 3 schematically shows the architecture of the decision-making according to exemplary embodiments. The rectangles (square and rounded) and the ellipse indicate steps. The arrow leading away in each case points to a subsequent step that follows if all criteria that are "upstream" from an arrow are met (like a "yes" decision).

The rectangle S1 represents a query that checks whether a lane change of the fourth motor vehicle 34 was detected. Alternatively, S1 could also query whether a lane change probability of the fourth motor vehicle 34 is greater than a previously specified probability value. The rectangle S2 represents a query that checks whether the distance between the first and third motor vehicle 28, 32 is large enough for the fourth motor vehicle 34 to merge into it. If the conditions of rectangles S1 and S2 are met, the condition of rectangle S3 is queried. S3 checks whether the fourth motor vehicle 34 merges into the gap between the first and third motor vehicles.

Rectangle S4 represents a query that checks whether a traffic jam situation has been detected. This can be done, for example, by a calculated traffic jam probability and a threshold value. Other methods, some of which have already been described, are also possible. If the conditions of rectangles S3 (i.e., also S1 and S2) and S4 are met, the control system detects a zipper method/zipper situation according to the ellipse S5. S5 is shown as an ellipse because no other criterion (other than the "upstream" criteria) is checked. Either a value is calculated or set for the zipper situation, or the ellipse S5 is just a placeholder and the arrows coming into the ellipse S5 could point directly to the rectangle S8 (without the ellipse S5 existing).

Rectangle S6 represents a query that checks whether the second motor vehicle 30 is located in the lateral direction between one's own motor vehicle and the first motor vehicle 12, 28. The rectangle S7 represents a query that checks whether a relative speed of the second motor vehicle 30 relative to one's own motor vehicle 12 or to the first motor vehicle 28 is low. If all the prerequisites from S5, S6 and S7 (that is to say effectively S1 to S7) are met, the target distance is adapted, which is represented in the rectangle S8. Nothing is checked in this step (S8). This should be represented by the rounded corners of the rectangle S8.

It should be understood that the exemplary embodiments discussed above are not exhaustive and do not limit the subject matter disclosed herein. In particular, it is obvious to a person skilled in the art that he or she can combine the features of the various embodiments with one another and/or may omit various features of the embodiments without departing from the subject matter disclosed herein.

The invention claimed is:

1. A control system for one's own motor vehicle, comprising an electronic controller configured to execute a control method, based on environmental data obtained from at least one environmental sensor associated with the one's own motor vehicle, to detect lanes, lane demarcations, lane markings, other motor vehicles and/or objects in an area in front of, laterally next to, and/or behind the one's own motor vehicle, wherein the at least one environment sensor is configured to provide the electronic controller of the control system with environmental data reflecting the area in front of, laterally next to, and/or behind the one's own motor vehicle, and wherein the electronic controller is further configured to execute the control method to:

determine, from the environmental data provided, a position and a speed of a first motor vehicle which is traveling directly ahead of the one's own motor vehicle in a first lane, wherein the one's own motor vehicle is located in the first lane;

determine, from the environmental data provided, a position and a speed of a second motor vehicle, which is traveling in an adjacent lane which is adjacent to the first lane;

detect, from the environmental data provided, a position of a third motor vehicle which is traveling directly ahead of the first motor vehicle in the first lane and a position of a fourth motor vehicle which is traveling ahead of the second motor vehicle in the adjacent lane;

detect, from the environment data provided, whether a traffic jam situation exists;

determine that a zipper situation exists in a case where the fourth motor vehicle merges from the adjacent lane to the first lane into a gap between the first motor vehicle and the third motor vehicle and the traffic jam situation exists; and in a case where it is determined that the zipper situation exists, increase a target distance of the one's own motor vehicle to the first motor vehicle in a case where an amount of a relative speed of the second motor vehicle relative to the one's own motor vehicle or relative to the first motor vehicle is less than a predefined first value, and the second motor vehicle is located between the one's own motor vehicle and the first motor vehicle in a longitudinal direction which extends along the adjacent lane.

2. The control system according to claim 1, wherein the electronic controller is further configured to execute the control method to:

determine, from the environmental data provided, a lane change probability which indicates a probability that the fourth motor vehicle will merge from the adjacent lane to the first lane into the gap between the first motor vehicle and the third motor vehicle; and detect that the zipper situation exists in a case where the lane change probability is greater than a predefined probability value and the traffic jam situation exists.

3. The control system according to claim 2, wherein the lane change probability is determined using at least one of the following factors:
a speed and/or an acceleration of the fourth motor vehicle,
a position in a lateral direction of the fourth motor vehicle on the adjacent lane, wherein a lateral direction is perpendicular to the longitudinal direction, or
a distance between the first motor vehicle and the third motor vehicle.

4. The control system according to claim 1, wherein the electronic controller is further configured to execute the control method to:
detect that the traffic jam situation exists in a case where a difference between an average speed of motor vehicles in the first lane and an average speed of motor vehicles in the adjacent lane is less than a predefined second value.

5. The control system (10) according to claim 1, wherein the electronic controller is further configured to execute the control method to:
detect that the traffic jam situation exists in a case where a number of motor vehicles which are in the adjacent lane and which pass the one's own motor vehicle or are passed by the one's own motor vehicle in a predefined time period is less than a predefined third value.

6. The control system according to claim 1, wherein the electronic controller is further configured to execute the control method to:
detect that the zipper situation exists in a case where there is an obstacle in the adjacent lane ahead in a direction of travel of the one's own motor vehicle.

7. The control system according to claim 1, wherein the target distance of the one's own motor vehicle from the first motor vehicle is increased to a lesser extent in a case where the second motor vehicle is faster than the one's own motor vehicle than in a case where the second motor vehicle is slower than the one's own motor vehicle.

8. The control system according to claim 1, wherein the target distance of the one's own motor vehicle from the first motor vehicle is increased to a greater extent in a case where the second motor vehicle is slower than one's own motor vehicle than in a case where the second motor vehicle is faster than the one's own motor vehicle.

9. The control system according to claim 1, wherein the first value is proportional to a speed of the one's own motor vehicle.

10. The control system according to claim 1,
wherein the zipper situation is a situation in which one of two lanes adjacent to each other ends at a position ahead in a traveling direction of the one's own motor vehicle or is no longer passable,
wherein the two lanes are both configured for traffic to travel in the same direction, and
wherein motor vehicles from the two lanes are to alternately merge into the continuing lane in such a manner that a motor vehicle that was traveling in the one lane alternates with a motor vehicle that was traveling in the other lane.

11. A control method which detects lanes, lane demarcations, lane markings, other motor vehicles and/or objects in an area in front of, laterally next to, and/or behind one's own motor vehicle based on environmental data obtained from at least one environmental sensor assigned to the one's own motor vehicle, wherein the control method is executable by an electronic controller, and wherein the control method comprises:
determining, from the environmental data provided, a position and a speed of a first motor vehicle, wherein the first motor vehicle travels directly ahead of the one's own motor vehicle in a first lane, and wherein the one's own motor vehicle is located in the first lane;
determining, from the environment data provided, a position and a speed of a second motor vehicle, wherein the second motor vehicle travels in an adjacent lane which is adjacent to the first lane;
detecting, from the environmental data provided, a position of a third motor vehicle which is traveling directly ahead of the first motor vehicle in the first lane and a position of a fourth motor vehicle which is traveling ahead of the second motor vehicle in the adjacent lane;
detecting, from the environment data provided, whether a traffic jam situation exists;
determining that a zipper situation exists in a case where the fourth motor vehicle merges from the adjacent lane to the first lane into a gap between the first motor vehicle and the third motor vehicle and the traffic jam situation exists; and
in a case where it is determined that the zipper situation exists, increasing a target distance of the one's own motor vehicle to the first motor vehicle in a case where an amount of a relative speed of the second motor vehicle relative to the one's own motor vehicle or relative to the first motor vehicle is less than a predefined first value and the second motor vehicle is located between the one's own motor vehicle and the first motor vehicle in a longitudinal direction which extends along the adjacent lane.

12. A motor vehicle comprising a control system including an electronic controller configured to execute a control method, based on environmental data obtained from at least one environmental sensor associated with the one's own motor vehicle, to detect lanes, lane demarcations, lane markings, other motor vehicles and/or objects in an area in front of, laterally next to, and/or behind the one's own motor vehicle, wherein the at least one environment sensor is configured to provide the electronic controller of the control system with environmental data reflecting the area in front of, laterally next to, and/or behind the one's own motor vehicle, and wherein the electronic controller is further configured to execute the control method to:
determine, from the environmental data provided, a position and a speed of a first motor vehicle which is traveling directly ahead of the one's own motor vehicle in a first lane, wherein the one's own motor vehicle is located in the first lane;
determine, from the environmental data provided, a position and a speed of a second motor vehicle, which is traveling in an adjacent lane which is adjacent to the first lane;
detect, from the environmental data provided, a position of a third motor vehicle which is traveling directly ahead of the first motor vehicle in the first lane and a position of a fourth motor vehicle which is traveling ahead of the second motor vehicle in the adjacent lane;

detect, from the environment data provided, whether a traffic jam situation exists;

determine that a zipper situation exists in a case where the fourth motor vehicle merges from the adjacent lane to the first lane into a gap between the first motor vehicle and the third motor vehicle and the traffic jam situation exists; and in a case where it is determined that the zipper situation exists, increase a target distance of the one's own motor vehicle to the first motor vehicle in a case where an amount of a relative speed of the second motor vehicle relative to the one's own motor vehicle or relative to the first motor vehicle is less than a predefined first value, and the second motor vehicle is located between the one's own motor vehicle and the first motor vehicle in a longitudinal direction which extends along the adjacent lane.

* * * * *